Jan. 15, 1924. 1,480,633
F. N. PETTEGREW
SPRING DEVICE
Filed Nov. 9, 1922 2 Sheets-Sheet 1
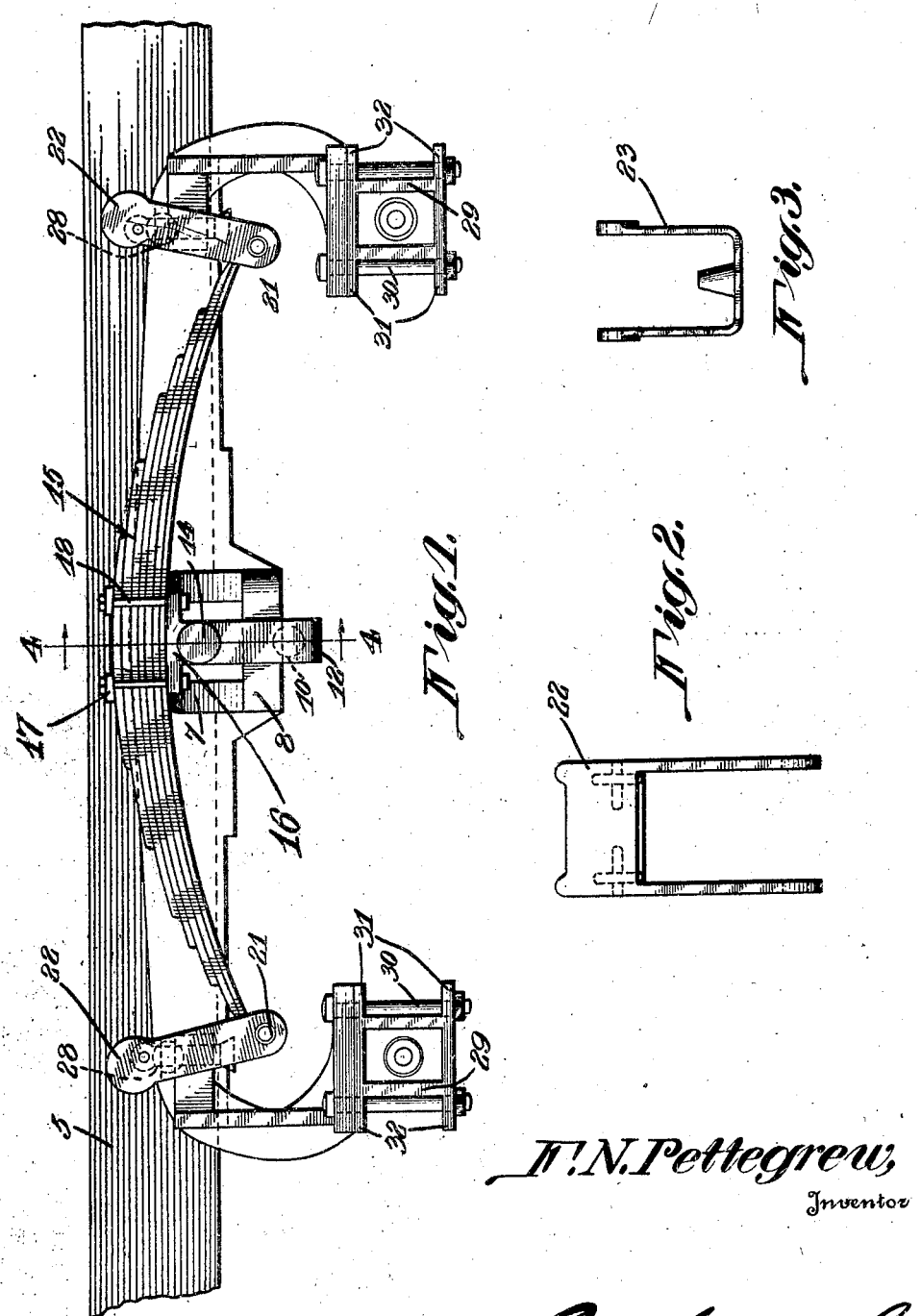

Jan. 15, 1924.
F. N. PETTEGREW
SPRING DEVICE
Filed Nov. 9, 1922
1,480,633
2 Sheets-Sheet 2
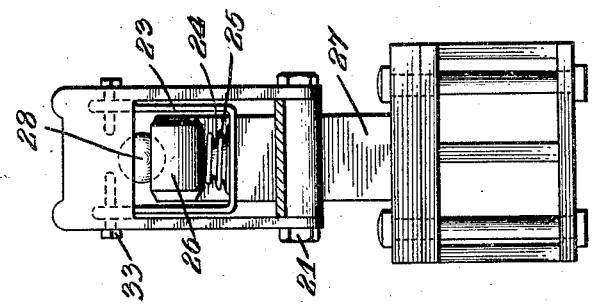
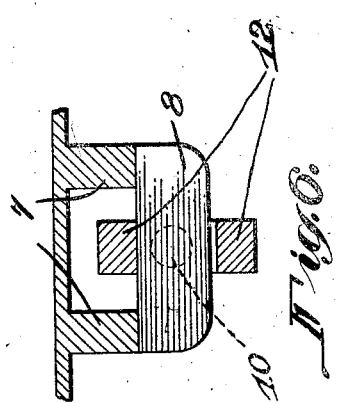
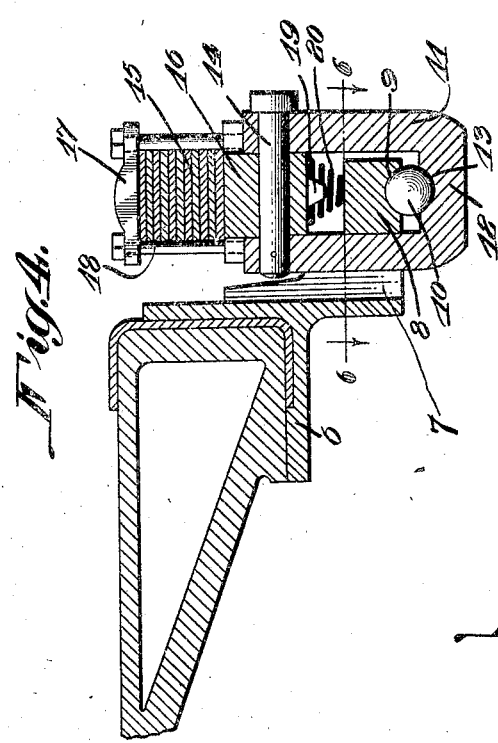
F. N. Pettegrew,
Inventor
By C. A. Snow & Co.
Attorneys Patented Jan. 15, 1924.

1,480,633

UNITED STATES PATENT OFFICE.

FRED N. PETTEGREW, OF FOX LAKE, WISCONSIN.

SPRING DEVICE.

Application filed November 9, 1922. Serial No. 599,839.

*To all whom it may concern:*

Be it known that I, FRED N. PETTEGREW, a citizen of the United States, residing at Fox Lake, in the county of Dodge and State of Wisconsin, have invented a new and useful Spring Device, of which the following is a specification.

This invention relates to motor vehicles and more particularly to motor vehicles of the truck type, the primary object of the invention being to provide a novel form of spring suspension, whereby the weight of the load supported by the truck will be equally distributed to the drive wheels of the truck.

Another object of the invention is to provide a spring suspension for a four-wheel drive truck, whereby the axles may move freely with respect to each other, while the wheels of the truck are passing over irregularities of a road surface, and at the same time allow the axles to maintain an equal proportion of the load.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental elevational view disclosing a double axle rear end construction.

Figure 2 is an elevational view of one of the shackles of the spring suspension.

Figure 3 is an elevational view of one of the stirrups employed in connection with the shackles.

Figure 4 is a sectional view taken on line 4—4 of Figure 1.

Figure 5 is an end elevational view of the suspension device.

Figure 6 is a sectional view taken on line 6—6 of Figure 4.

Referring to the drawings in detail and more particularly to Figure 1 wherein a double axle rear end construction is shown, the reference character 5 designates a side rail of a truck chassis formed preferably of channel iron and constructed to fit within the bracket member 6 that supports the mechanism employed for securing the axles to the vehicle. Each of these brackets includes spaced arms 7 that are connected at their outer ends by means of the bar 8 which is formed with a depression 9 to accommodate the ball 10.

Associated with the bracket is a U-shaped hanger indicated at 11 which has one of its arms disposed between the arms 7 of the bracket as clearly shown by Figure 6 of the drawings, the connecting bar 12 at the ends of the arms of the U-shaped hanger being formed with a depression 13 to receive the ball 10 and provide a bearing therefor.

Connecting the upper ends of the arms of the U-shaped hanger 11 is a bolt 14 which acts as a pivot for the semi-elliptical spring member 15, the leaves of the spring member 15 being secured at a point intermediate their ends, as by means of the bearing member 16 and transversely extending securing members 17, the securing members 17 having connection with the bearing member 16 as through the bolts 18 extending along the sides of the spring.

The bolt 14 is shown as extending through the bearing opening in the bearing member 16 to permit of slight movement of the intermediate portion of the spring member with respect to its hanger and support.

Depending from the bearing member is a lug 19 which accommodates the upper end of the coiled spring 20 in a manner to prevent lateral movement of the coiled spring with respect to the bearing member 16, the lower end of the coiled spring resting on the upper surface of the bar 8 of the bracket 6. The ends of the spring member 15 are supported on the shackle bolts 21 of the shackles 22 to which shackles 22 are pivotally secured the stirrups 23 that also carry upwardly extended lugs 24, which lugs 24 provide supports for the coiled springs 25 that have their upper ends contacting with the heads 26 of the curved arms 27.

Formed in the upper surface of the heads 26 are recessed portions to accommodate the ball bearings 28 that have their upper portions disposed in suitable recesses provided in the shackles 22, thereby allowing slight movement of the shackles with respect to the curved arms 27 and permitting the spring member associated therewith to expand under the weight of the load supported by the truck.

The curved arms 27 are bolted to the axle housings 29 as by means of the bolts 30 that extend through suitable openings provided in the flanges 31 and 32 of the axle housing. From the foregoing it will be seen that due to the construction as shown, either of the drive axles of the truck may be moved independently of the adjacent drive axle, compensating for irregularities in the road surface.

It might be further stated that the stirrups 23 are supported as by means of the bolts 33 that extend through suitable openings formed in the upper ends of the stirrups.

What is claimed as new is:—

1. In a device of the character described, a bracket member having a depression formed in the under side thereof, a U-shaped member associated with the bracket member and having a depressed portion, the depressed portions adapted to cooperate to accommodate a ball bearing, a spring member, means for pivotally supporting the spring member within the U-shaped member, and shackles at the ends of the spring member for pivotally supporting the spring member at the ends thereof.

2. In a device of the character described, a bracket member, a U-shaped member associated with the bracket member, a ball bearing disposed between the bracket member and U-shaped member, a spring member, means for pivotally connecting the spring member to the U-shaped member at a point intermediate the ends of the spring member, a coiled spring on the bracket and contacting with the means for supporting the spring member, and shackles disposed at the ends of the spring member.

3. In a device of the character described a bracket member, a spring, means for movably supporting the spring intermediate its ends, shackles at the ends of the springs, swinging stirrups associated with the shackles, and means disposed between the shackles and stirrups for permitting movement of the ends of the spring with respect to the shackles.

4. In a device of the character described, a bracket member, a spring member supported by the bracket member at a point intermediate the ends of the spring member, curved arms associated with the spring member at the ends of the spring member, shackles resting on the arms and having connection with the spring member, a ball bearing disposed between each shackle and curved arm associated therewith, stirrups positioned within the shackles, and resilient means positioned on the stirrups and contacting with the spring member.

5. In a device of the character described, a bracket member, a spring member, means for pivotally supporting the spring member on the bracket member, shackles at the end of the spring member, curved supporting arms, means for connecting the spring member to the shackles, pivoted members supported by the shackles, spring means disposed between the curved arms and the pivoted members, and ball bearings interposed between the shackles and curved arms.

In testimony that I claim the foregoing as my own, I have hereto affixed my signature in the presence of two witnesses.

FRED N. PETTEGREW.

Witnesses:
D. C. CHURCH,
JENNETTE RODGER.